R. R. LEWIS.
Hand Seed-Planter.
No. 216,423. Patented June 10, 1879.
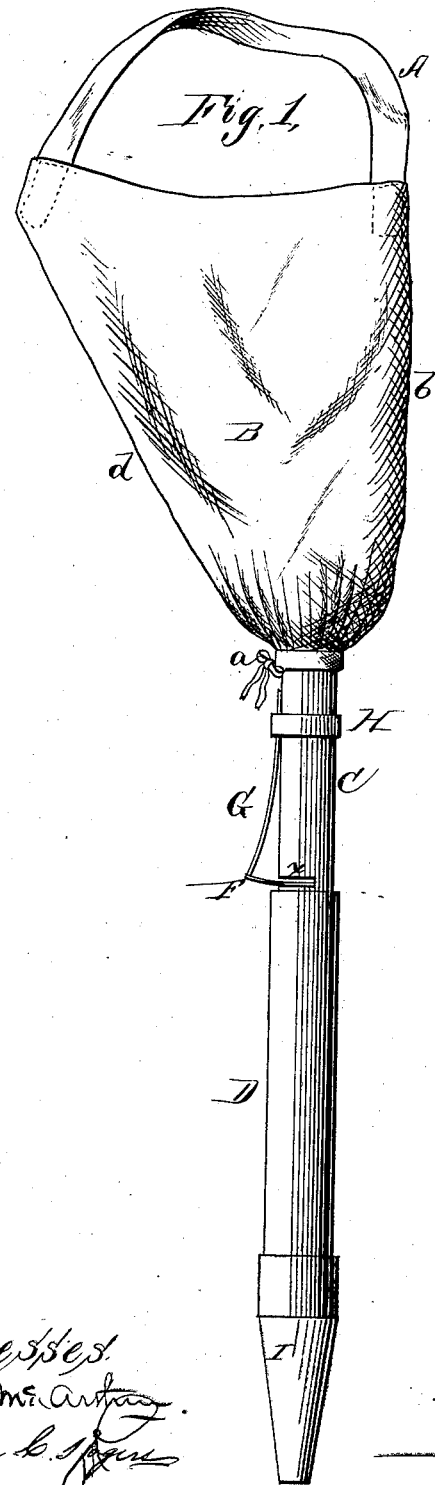
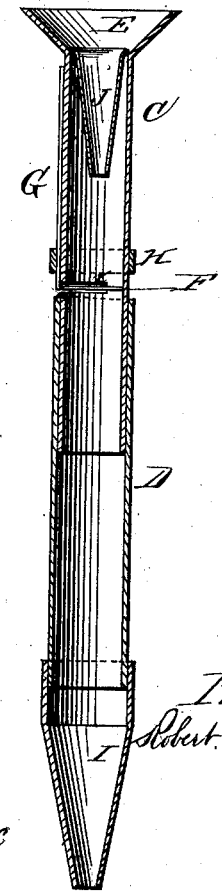

UNITED STATES PATENT OFFICE.

ROBERT R. LEWIS, OF DAWSON, GEORGIA, ASSIGNOR TO ROBERT R. LEWIS, WM. M. HAYES, AND H. L. BELL, OF SAME PLACE.

IMPROVEMENT IN HAND SEED-PLANTERS.

Specification forming part of Letters Patent No. 216,423, dated June 10, 1879; application filed May 10, 1879.

*To all whom it may concern:*

Be it known that I, ROBERT R. LEWIS, of Dawson, in the county of Terrell and State of Georgia, have invented certain new and useful Improvements in Hand Seed-Planters; and I do hereby declare that the following is a full, clear, and exact description thereof, reference being had to the accompanying drawings, and to the letters of reference marked thereon, which form part of this specification.

The nature of my invention consists in the construction and arrangement of a seed and guano hand-drill, as will be hereinafter more fully set forth.

In order to enable others skilled in the art to which my invention appertains to make and use the same, I will now proceed to describe its construction and operation, referring to the annexed drawings, in which—

Figure 1 is a side elevation of my improved hand-drill, and Fig. 2 is a longitudinal section of a part thereof.

A represents the strap which is intended to support the implement from the neck of the operator. It is fastened to a sack, B, which has at the bottom an orifice, with draw-string $a$, by means of which it is attached to a tube, usually made of tin and made of two sections, C and D, so that it may be lengthened or shortened to suit the operator. The first section, C, of this tube has a funnel-shaped mouth, E, inclosed by the lower end of the sack B. In this section is cut a slot, $x$, a suitable distance below the sack.

F is a stop attached to a spring, G, said spring being fastened on the outside at the upper end of the tube-section C, and the stop working in the slot $x$ in the tube to regulate the passage of the seed or guano through the tube.

H is a movable band, which works around the tube over the spring G, and is used to depress the spring and gage the stop or cut-off F, so that the quantity of grain or guano may be regulated in its passage through the tube.

The second or lower section, D, of the tube is made to fit upon the first or upper section, C, and is used to adjust the implement to the height of the operator.

On the lower end of the section D works the nozzle I, by which the flow of seed or guano is concentrated into the furrow.

By the use of the movable band H the tube may be entirely closed while the sack is being filled.

In the top of the tube, above the stop or cut-off, is inserted a small funnel, J, for sowing garden-seed.

This implement is cheap, simple, practicable, and durable.

The sack B is made straight on one side, $b$, from its connection with the tube to the top, thus giving room for the arm of the operator, whose right hand guides the tube and controls the spring, while the other side, $d$, of the sack is cut somewhat in semicircular shape, so that its contents may be occasionally shifted with the left hand, in order that they may the more readily pass into the mouth of the tube.

With this implement all kinds of grain—such as wheat, rye, pease, corn, and rice, as well as all kinds of smaller seeds—can, with perfect ease, be sown in the drill in quantities to suit the operator.

Having thus fully described my invention, what I claim as new, and desire to secure by Letters Patent, is—

1. The funnel J, in combination with the hand-drill herein described, for the purposes set forth.

2. The movable band H, in combination with the spring G and stop F, for the purposes herein set forth.

3. The within-described hand seed-planter, consisting of telescopic tube C D, funnel-shaped mouth E, nozzle I, stop F, spring G, bag B, and strap A, all as and for the purpose set forth.

In testimony that I claim the foregoing as my own I affix my signature in presence of two witnesses.

ROBERT R. LEWIS.

Witnesses:
L. M. LENNARD,
J. C. F. CLARK.